United States Patent Office 3,393,244
Patented July 16, 1968

---

3,393,244
BIS(p-HYDROXYCUMYL)BENZENE
George F. Broderick, Sparta, Bryce C. Oxenrider, Florham Park, and John Vitrone, Parsippany, N.J., assignors to Allied Chemical Corporation, New York, N.Y., a corporation of New York
No Drawing. Filed Sept. 25, 1961, Ser. No. 140,221
9 Claims. (Cl. 260—619)

This invention relates to production of new bisphenols useful in the preparation of more complex organic derivatives.

It is an object of this invention to provide new and useful bisphenols, namely 1,4-bis(p-hydroxycumyl) benzene and 1,3-bis(p-hydroxycumyl) benzene. Another object of the present invention is to provide a process for the production in high yield of 1,4-bis(p-hydroxycumyl) benzene and 1,3-bis(p-hydroxycumyl) benzene. Other objects and advantages of the invention will be apparent hereinafter.

1,4-bis(p-hydroxycumyl) benzene, a white crystalline solid having a melting point of about 190° to 192° C., has the following structural formula:

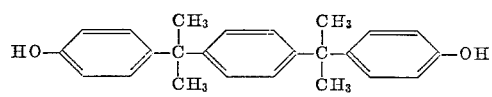

1,3-bis(p-hydroxycumyl) benzene, a white crystalline solid having a melting point of about 138° to 140° C., possesses the following structural formula:

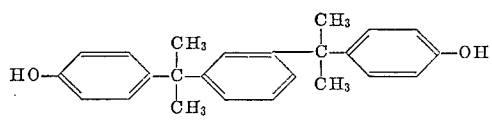

When p-diisopropylbenzene-α,α'-diol (hereafter referred to as the dicarbinol of 1,4-diisopropyl benzene) or m-diisopropylbenzene-α,α'-diol (hereafter referred to as the dicarbinol of 1,3-diisopropyl benzene) is reacted with phenol in the presence of sulfuric acid as catalyst, even at elevated temperatures of 70° to 130° C., little or no yield of 1,4-bis(p-hydroxycumyl) benzene or 1,3-bis(p-hydroxycumyl) benzene is obtained.

We have now discovered that 1,4-bis(p-hydroxycumyl) benzene or 1,3-bis(p-hydroxycumyl) benzene may be prepared in high yield by reacting the dicarbinol of 1,4-diisopropyl benzene or the dicarbinol of 1,3-diisopropyl benzene with at least a stoichiometric amount of phenol at a temperature of about 40° C. to 100° C. in the presence of anhydrous hydrogen chloride as catalyst. The resulting reactions may be represented by the following equations:

(1)
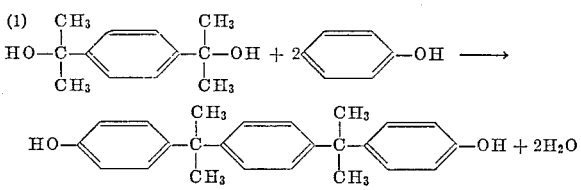

1,4-bis(p-hydroxycumyl) benzene (2)
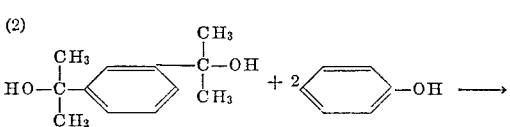

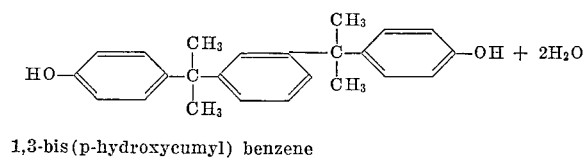

1,3-bis(p-hydroxycumyl) benzene

Although the reaction may be carried out using the stoichiometric quantities of the dicarbinol of the diisopropyl benzene and phenol, it has been discovered that greater efficiency and higher yield of product are obtained when about 8 to 13 mols of phenol per mol of the dicarbinol of diisopropyl benzene are employed.

The amount of anhydrous hydrogen chloride catalyst employed is not critical and is conveniently introduced by saturating the phenol with gaseous hydrogen chloride.

The reaction may be carried out at temperature within the range of 40° to 100° C.; however, particularly outstanding results are obtained when the reaction temperature is maintained within the range of about 40° to 70° C.

The desired product may be recovered from the reaction mass by any convenient means. For example, the reaction mass may be slurried with hot water and the 1,4-bis(p-hydroxycumyl) benzene or 1,3-bis(p-hydroxycumyl) benzene filtered off. The product may then be purified by means known in the art, such as by recrystallization from a suitable solvent such as acetone, methanol, toluene, benzene, etc.

In preferred operation, phenol heated to the desired temperature is saturated with gaseous hydrogen chloride. The dicarbinol of 1,4-diisopropyl benzene or 1,3-diisopropyl benzene is then added gradually, for example, over a period of about ½ to 2½ hours, until the desired mol ratio is realized. This preferred procedure possesses the advantage of securing maximum mol ratio of phenol to the dicarbinol of diisopropyl benzene in the initial step of the reaction. Further, since the reaction is exothermic in nature, the use of heat dissipating equipment is minimized or avoided.

We have found that when 1,4-bis(p-hydroxycumyl) benzene and 1,3-bis(p-hydroxycumyl) benzene are produced by the process of this invention, high yields of product are obtained. For example, in the production of 1,4-bis(p-hydroxycumyl) benzene, the resulting yields are in the order of at least 90 percent of theory.

1,4-bis(p-hydroxycumyl) benzene and 1,3-bis(p-hydroxycumyl) benzene are of particular utility in the production of polycarbonate resins. A polycarbonate resin may be prepared, for example, by reacting 1,4-bis(p-hydroxycumyl) benzene or 1,3-bis(p-hydroxycumyl) benzene with phosgene in an emulsion system containing aqueous caustic and a non-polar solvent such as ethylene chloride. The resulting resin has been found to have an unusually high glass transition temperature; for example, 154° C. in the case of 1,4-bis(p-hydroxycumyl) benzene. Due to such high glass transition temperature, the polycarbonate possesses a high dimensional stability and, thus, is eminently suitable for the preparation of molded articles which are capable of retaining their shapes at elevated temperatures up to the glass transition temperature. The resulting resin has also been found to form a film having outstanding tensile properties.

1,4-bis(p-hydroxycumyl) benzene and 1,3-bis (p-hydroxycumyl) benzene may be reacted with epichlorohydrin in alkaline medium to form epoxy resins. They also find utility in accelerating the curing of epoxy resins. For example, when an epoxy resin prepared by the reaction of a bisphenol such as 2,2-bis(p-hydroxyphenyl) propane, i.e., Bisphenol-A, and epichlorohydrin is treated with a small amount, in the order of about 10 weight percent, of 1,4-bis(p-hydroxycumyl) benzene or 1,3-bis(p-hydroxycumyl) benzene, a substantial increase in curing rate results which is especially advantageous where laminates are being prepared and where quick set time gives faster dimensional stability to the laminate.

In addition, 1,4-bis(p-hydroxycumyl benzene and 1,3-bis (p-hydroxycumyl) benzene, when reacted with dihalogenated compounds such as 1,4-dichlorobutene-2 or p-xylylene dichloride, form polyethers. When hydrogenated, they form glycol compounds which may be used in the preparation of polyesters or polyurethanes.

The following examples are given for the purpose of illustrating the present invention but are not intended to be limiting on the scope thereof. In the examples, parts are by weight.

Example 1

1100 parts of phenol were heated to temperature of 50° to 60° C. in a vessel provided with a stirrer. The phenol was then saturated with gaseous hydrogen chloride. 194 parts of the dicarbinol of 1,4-diisopropyl benzene were then added to the reaction mass over a one-hour period. The reaction mass was maintained at temperature of 50° to 60° C. for an additional period of 2½ hours. The resulting product was slurried with about 10 times its weight of hot water and filtered off. The product was then purified by recrystallization twice from acetone to give 313 parts of a white crystalline solid having a melting point of 190° to 192° C., identified as 1,4-bis(p-hydroxycumyl) benzene. This amount of product corresponded to a yield of 90 percent of theory based upon the dicarbinol charged.

Elemental analysis of the product gave 7.36 percent hydrogen and 83.3 percent carbon (theory—7.52 percent hydrogen and 83.3 percent carbon). Analysis for the hydroxyl group gave 9.85 percent against theory of 9.82 percent for 1,4-bis(p-hydroxycumyl) benzene. The infrared spectrum of the product showed the characteristic bonds for the hydroxyl group, the aromatic nuclei and the methyl groups and also that the substituents on the aromatic rings were predominantly para.

Example 2

A mixture of 5 parts of the dicarbinol of 1,4-diisopropyl benzene and 45 parts of phenol was heated in a vessel provided with a stirrer to temperature of 75° C. Gaseous hydrogen chloride was then added over a 5-minute period until saturation occurred, the temperature rising to 98° C. The temperature then slowly decreased and was maintained at 70° to 80° C. for a period of 30 minutes. The product was allowed to cool and remain for several hours as a solid. The solid product was then liquefied by heating it to 70° C., and about 2000 parts of hot water were added with stirring. Upon cooling to room temperature, a semisolid product was filtered off which was essentially free of unreacted phenol. After washing the product with water, it was recrystallized from methanol and then from acetone to give a white crystalline solid comprising 1,4-bis(p-hydroxycumyl) benzene.

Example 3

135 parts of phenol were heated to temperature of about 45° to 50° C. for a period of 1 hour in a vessel provided with a stirrer. The phenol was then saturated by the continuous addition of gaseous hydrogen chloride. The temperature was increased to about 55° to 60° C., and 30 parts of the dicarbinol of 1,3-diisopropyl benzene were added with constant stirring over a period of 10 minutes. After addition of the dicarbinol, the continuous stirring and gaseous hydrogen chloride addition were maintained at temperature of 55° to 60° C. for one hour. The resulting product was then slurried with 10 times its volume of warm (60° C.) water and was agitated for several minutes. A two-phase system resulted and the upper aqueous layer was removed by decantation and discarded. The remaining organic layer was slurried with 10 times its volume of warm water. The resulting reaction product was then filtered off and washed several times with water to effect removal of residual phenol.

The solid product was then dissolved in 113 parts of toluene at 75° C., filtered to remove solid impurities, cooled to about 30° C. and then filtered again. The product was recrystallized once more from 150 parts of toluene and dried in a rotary steam drier under vacuum conditions to give 25.5 parts of a white crystalline solid having a melting point of about 138° to 140° C., identified as 1,3-bis(p-hydroxycumyl) benzene. This amount of product corresponded to a yield of 48 percent of theory based upon the dicarbinol charged.

It is to be understood that the foregoing is by way of illustration and that changes and modifications may be made within the scope of the claims without departing from the spirit of the invention.

We claim:
1. A bisphenol of the group consisting of 1,4-bis(p-hydroxycumyl) benzene and 1,3-bis(p-hydroxycumyl) benzene.
2. 1,4-bis(p-hydroxycumyl) benzene.
3. 1,3-bis(p-hydroxycumyl) benzene.
4. A process for the production of a bisphenol of the group consisting of 1,4-bis(p-hydroxycumyl) benzene and 1,3-bis(p-hydroxycumyl) benzene which comprises reacting the corresponding dicarbinol of diisopropyl benzene with at least a stoichiometric amount of phenol at a temperature of about 40° to 100° C. in the presence of anhydrous hydrogen chloride as catalyst and recovering the bisphenol from the resulting reaction mass.
5. A process in accordance with claim 4 wherein the reactants are phenol and the dicarbinol of 1,4-diisopropyl benzene.
6. A process in accordance with claim 4 wherein the reactants are phenol and the dicarbinol of 1,3-diisopropyl benzene.
7. A process in accordance with claim 4 wherein the reaction temperature is about 40° to 70° C.
8. A process in accordance with claim 4 wherein the mol ratio of phenol to the dicarbinol of diisopropyl benzene is about 8–13 to 1.
9. A process in accordance with claim 4 wherein the dicarbinol of diisopropyl benzene is added in a gradual manner to the phenol.

References Cited

UNITED STATES PATENTS

| | | | |
|---|---|---|---|
| 2,285,626 | 6/1942 | Taylor et al. | 260—619 |
| 2,440,909 | 5/1948 | Niederl | 260—619 |
| 2,247,402 | 7/1941 | Perkins et al. | 260—619 |
| 2,548,435 | 4/1951 | Lorand et al. | 260—618 XR |
| 2,730,502 | 1/1956 | Beauer et al. | 260—619 XR |
| 2,865,887 | 12/1958 | Mackenzie | 260—619 XR |

BERNARD HELFIN, *Primary Examiner.*

CHARLES B. PARKER, HAROLD G. MOORE, LEON ZITVER, LORRAINE A. WEINBERG, *Examiners.*

J. E. EVANS, *Assistant Examiner.*